US008625857B2

(12) United States Patent　　(10) Patent No.: US 8,625,857 B2
Yamaguchi et al.　　(45) Date of Patent: Jan. 7, 2014

(54) IMAGE PROCESSING METHOD AND IMAGE PROCESSING APPARATUS

(75) Inventors: Takashi Yamaguchi, Kawasaki (JP); Takeo Miki, Machida (JP); Kenji Miyazaki, Komae (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 13/151,888

(22) Filed: Jun. 2, 2011

(65) Prior Publication Data

US 2012/0027264 A1　Feb. 2, 2012

Related U.S. Application Data

(63) Continuation of application No. PCT/JP2008/072722, filed on Dec. 8, 2008.

(30) Foreign Application Priority Data

Dec. 5, 2008　(JP) .................................. 2008-311460

(51) Int. Cl.
*G06K 9/00*　　(2006.01)
(52) U.S. Cl.
USPC ......................................... 382/112; 358/3.28
(58) Field of Classification Search
USPC .................. 382/100, 112; 358/3.28; 713/176
See application file for complete search history.

(56) References Cited

U.S. PATENT DOCUMENTS

| 5,684,885 | A | * | 11/1997 | Cass et al. ....................... 382/100 |
| 5,987,272 | A | | 11/1999 | Maeda et al. ..................... 399/58 |
| 2005/0116029 | A1 | | 6/2005 | Miki et al. ....................... 235/380 |
| 2005/0134622 | A1 | | 6/2005 | Yamaguchi et al. ............. 347/15 |
| 2007/0177216 | A1 | | 8/2007 | Miki et al. ..................... 358/3.26 |
| 2007/0223780 | A1 | | 9/2007 | Yamaguchi et al. .......... 382/100 |

FOREIGN PATENT DOCUMENTS

| JP | 11-168616 A | 6/1999 | ............. H04N 1/387 |
| JP | 2001-148755 A | 5/2001 | ............... H04N 1/00 |
| JP | 2002-283598 A | 10/2002 | ............... B41J 2/325 |
| JP | 2005-178367 A | 7/2005 | ............. B42D 15/10 |
| JP | 2007-060527 A | 3/2007 | ............. H04N 1/387 |
| JP | 2007-203516 A | 8/2007 | ............... B41J 2/325 |
| WO | WO 2005/094058 A1 | 10/2005 | ............. H04N 1/387 |

OTHER PUBLICATIONS

European Search Report dated Jul. 31, 2012.
International Search Report for PCT/JP2008/072722, dated Jan. 27, 2009.

* cited by examiner

*Primary Examiner* — Andrew W Johns
(74) *Attorney, Agent, or Firm* — Pillsbury Winthrop Shaw Pittman, LLP

(57) ABSTRACT

According to one embodiment, an image processing method for inspecting an image includes creating synthetic image information in which information is synthesized with main image information in a visible state which the human eyes perceive in an invisible state which is hard to perceive with the human eyes, printing the synthetic image information onto a medium, acquiring an image printed on the medium as an inspection image information, extracting information embedded in the main image information from the inspection image acquired, and determining a fault in the image printed on the medium based on an extraction result of information.

18 Claims, 11 Drawing Sheets

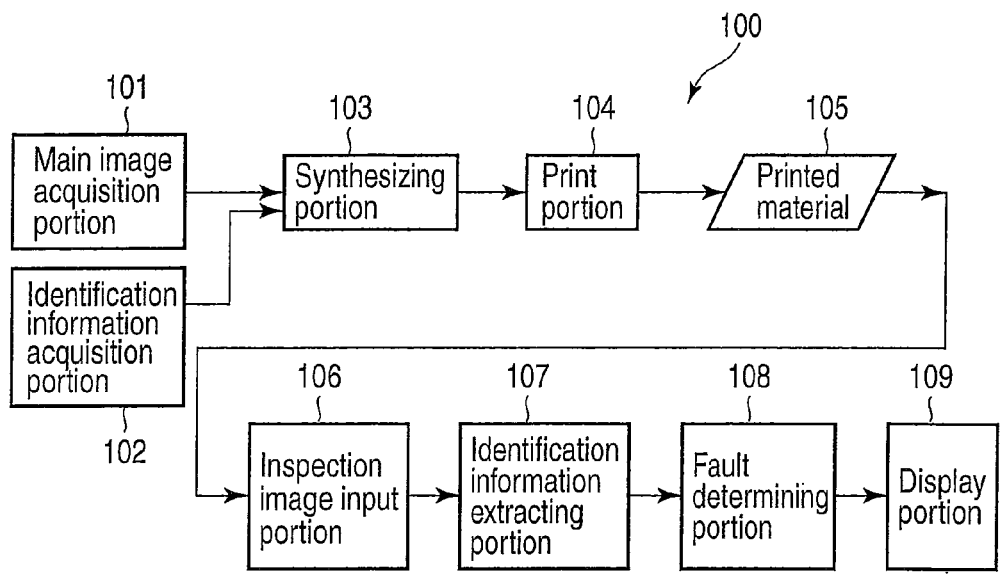
F I G. 1
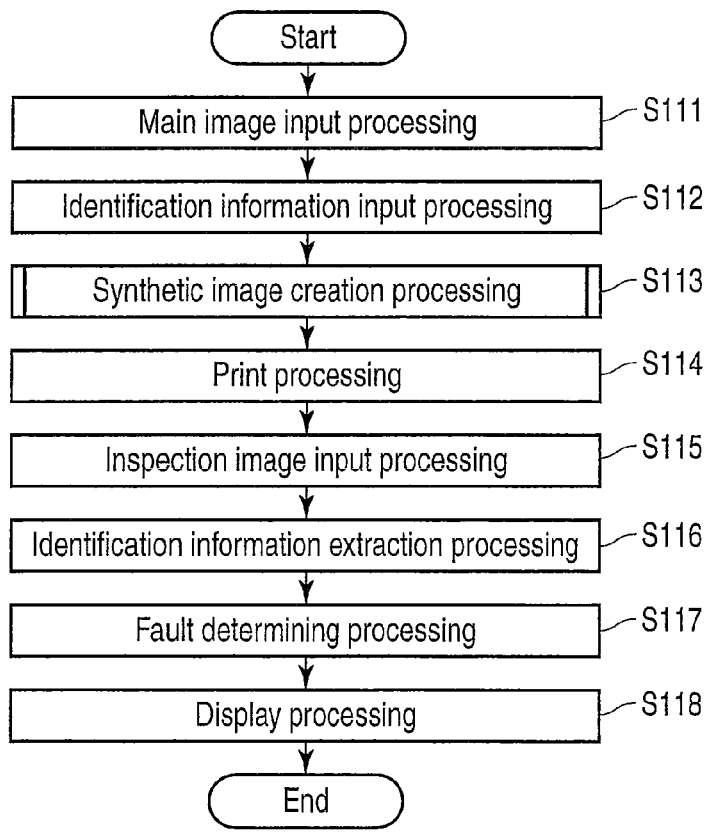
F I G. 2

FIG. 4A  0011110000111100

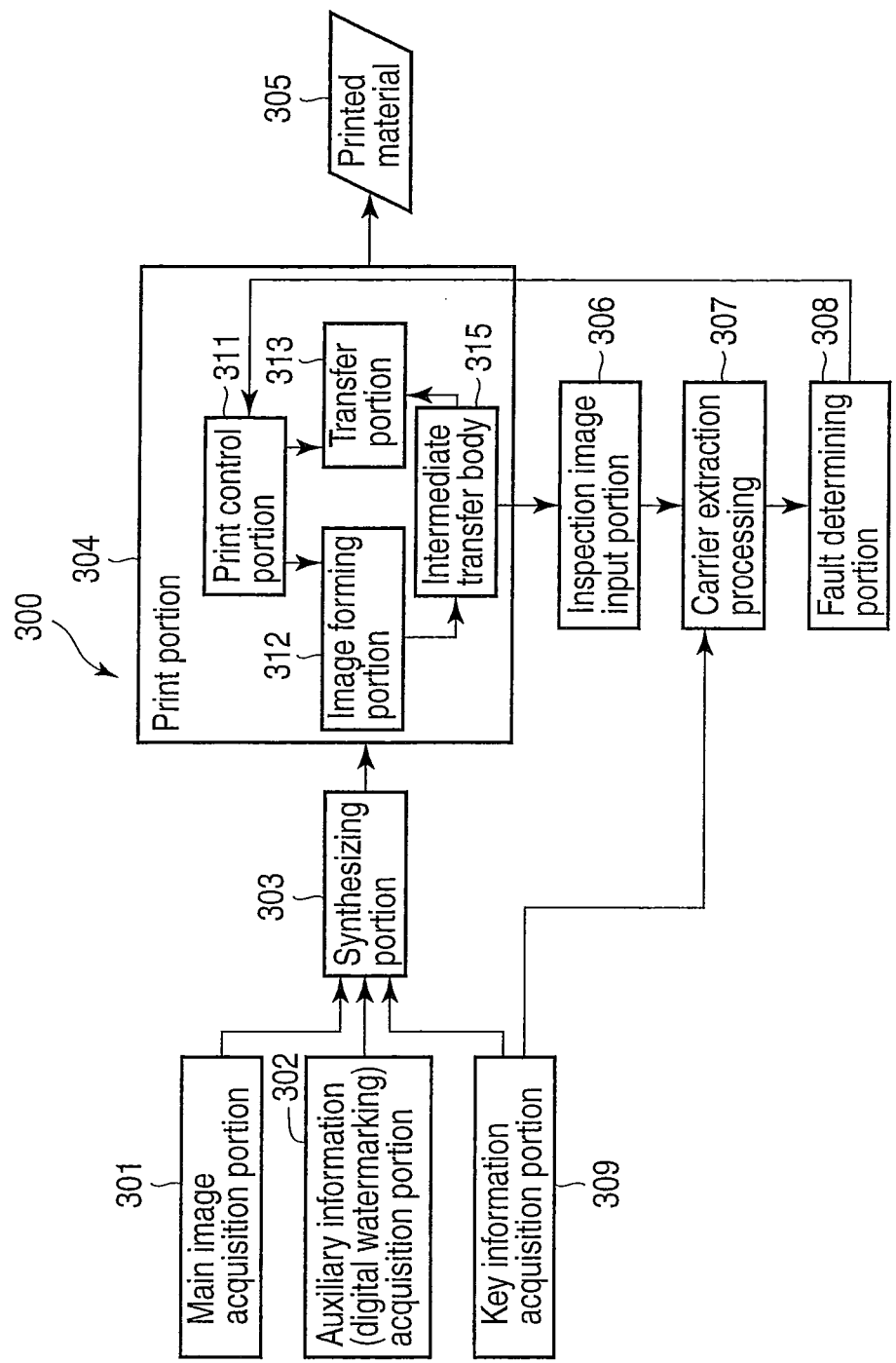
F I G. 12

F I G. 1 4A 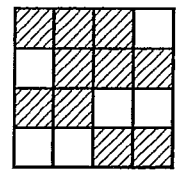
F I G. 1 4B
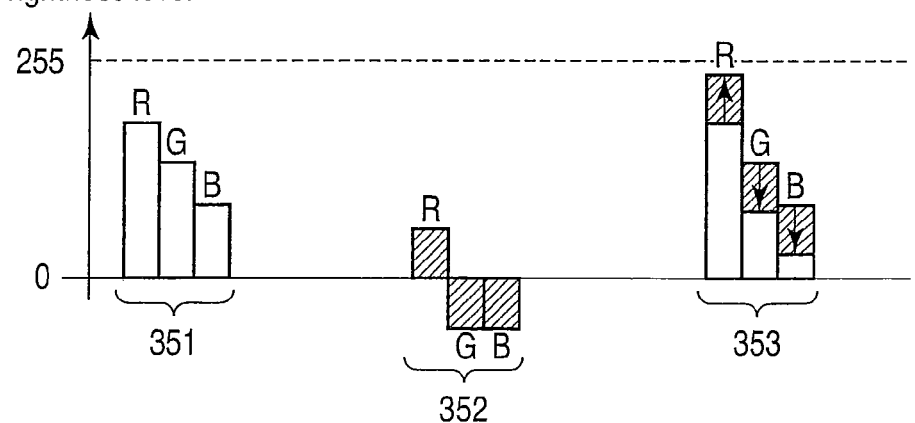
F I G. 1 5

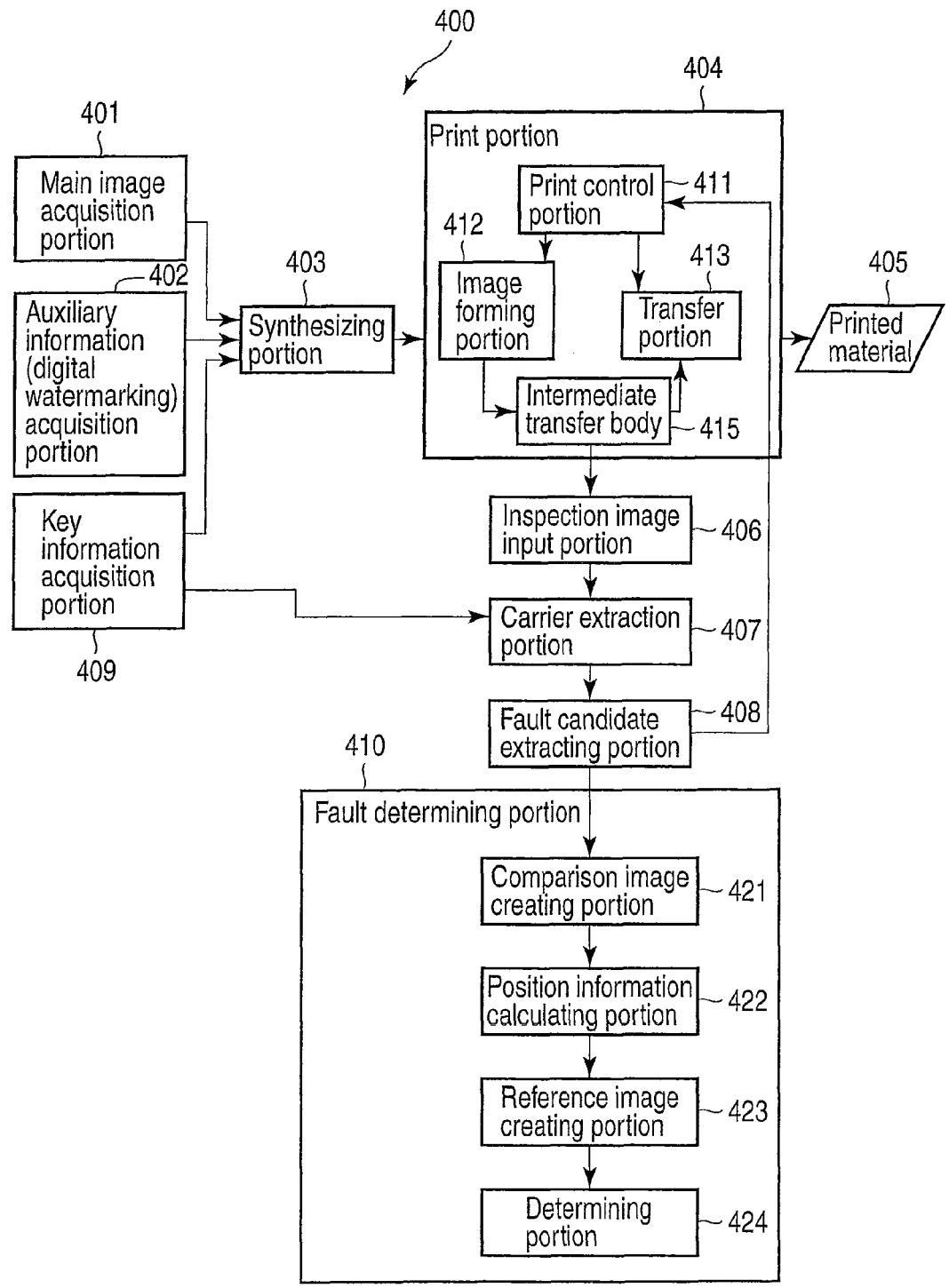
F I G. 1 6

IMAGE PROCESSING METHOD AND IMAGE PROCESSING APPARATUS

CROSS-REFERENCE TO RELATED APPLICATIONS

This is a Continuation Application of PCT Application No. PCT/JP2008/072722, filed Dec. 8, 2008, which was published under PCT Article 21 (2) in English.

This application is based upon and claims the benefit of priority from Japanese Patent Application No. 2008-311460, filed Dec. 5, 2008, the entire contents of which are incorporated herein by reference.

FIELD

Embodiments described herein relate generally to an image processing method and an image processing apparatus.

BACKGROUND

Conventionally, the thermal transfer recording method using a thermal head is likely to be affected by dust or dirt adhering between an image receiving layer and an ink ribbon or between the thermal head and the ink ribbon. That is, the thermal transfer recording method sometimes may suffer from any image fault such as slip-out of a particular color and inability of securing a particular color due to the dust or the like. Such an image fault is inspected by human naked eyes after transfer/recording to a recording medium is completed. Further, if the fault in an image is remarkable, that recording medium is abandoned as a defective product and then a new recording medium is made again.

Further, as a method for forming an image on a personal authentication recording medium such as the ID card, intermediate transfer recording method is available. The intermediate transfer recording method is an image forming method for transferring an image formed on an intermediate transfer body (intermediate recording medium) to a final recording medium such as an IC card. According to the intermediate transfer recording method, for example, a thermal head is heated corresponding to image information so as to record (transfer) ink on an ink ribbon to a transparent intermediate transfer body and an image formed on the intermediate transfer body is transferred to a recording medium such as an ID card. According to the intermediate transfer recording method, an image is formed on the intermediate transfer body having a specialized image receiving layer, different from the method for forming directly on the recording medium. Thus, the intermediate transfer recording method is less affected by the status of a transfer surface on a recording medium so as to form a stable image.

On the other hand, to prevent forgery or falsification, often a recording medium such as an IC chip incorporated card (IC card) or brochure (IC brochure) is used as a personal authentication recording medium. The recording medium containing the IC chip is an expensive recording medium. Abandonment of such an expensive recording medium for the reason of the image fault increases an economic loss.

BRIEF DESCRIPTION OF THE DRAWINGS

FIG. 1 is a block diagram showing schematically a configuration example of an image processing apparatus according to a first embodiment.

FIG. 2 is a flow chart for explaining schematically a flow of processing in the image processing apparatus according to the first embodiment.

FIGS. 4A and 4B are diagrams showing an example of identification information.

FIG. 12 is a block diagram showing schematically an example of the configuration of the image processing apparatus according to a third embodiment.

FIGS. 14A and 14B are diagrams showing an example of key information.

FIG. 15 is a diagram showing an example of digital watermark embedding processing using superimposes processing.

FIG. 16 is a block diagram showing schematically an example of the configuration of the image processing apparatus according to a fourth embodiment.

DETAILED DESCRIPTION

Figure 3:
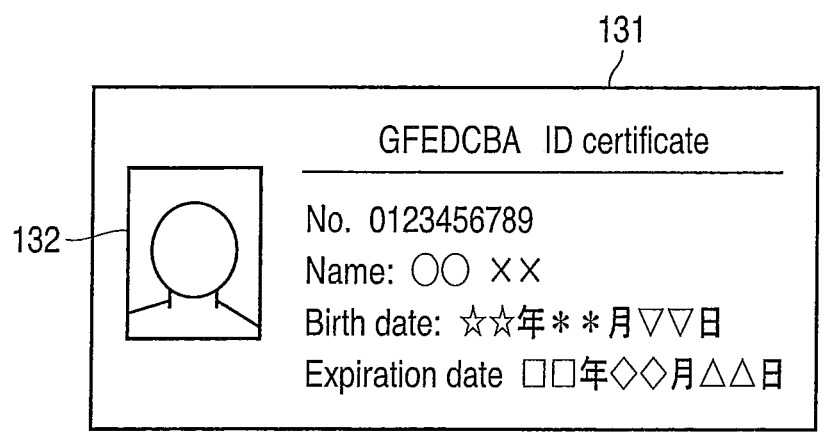
FIG. 3 is a diagram showing an example of an ID card as a print object.

In general, according to one embodiment, an image processing method for inspecting an image includes creating synthetic image information in which information is synthesized with main image information in a visible state which the human eyes perceive in an invisible state which is hard to perceive with the human eyes, printing the synthetic image information onto a medium, acquiring an image printed on the medium as an inspection image information, extracting information embedded in the main image information from the inspection image acquired, and determining a fault in the image printed on the medium based on an extraction result of information.

First, the first embodiment will be described.

FIG. 1 is a block diagram showing schematically an example of the configuration of the image processing apparatus according to the first embodiment.

As shown in FIG. 1, an image processing apparatus 100 includes a main image acquisition portion 101, an identification information acquisition portion 102, a synthesizing portion 103, a print portion 104, an inspection image input portion 106, an identification information extracting portion 107, a fault determining portion 108 and a display portion 109. Each of these portions is a function which is achieved when a control portion (not shown) executes a control program.

The main image acquisition portion 101 acquires information of a main image (main image) to be recorded in a recording medium. For example, the main image acquisition portion 101 is achieved when the control portion controls an interface for image input. As the main image information which the main image acquisition portion 101 intends to acquire, a face image for certification to be printed on the recording medium is expected.

The identification information acquisition portion 102 acquires identification information to be buried into the main image information. For example, the identification information acquisition portion 102 is achieved when the control portion controls the interface for identification information input. The identification information acquired by the identification information acquisition portion 102 is information which is used for detecting a fault of print in a processing (fault determining processing) described later.

The synthesizing portion 103 creates synthetic image information by synthesizing the main image information and the identification information. For example, the synthesizing portion 103 is achieved by control portion's executing a program for image processing (image synthesizing processing) using a memory for memorizing image information. The synthesizing portion 103 is assumed to create synthetic image information in which identification information acquired by the identification information acquisition portion 102 is embedded in the main image information acquired by the main image acquisition portion 101 in a state not easy for human eyes to perceive (in an invisible state). In the meantime, in the first embodiment, a case where the creation method for the synthetic image information acquired by frequency conversion using Fourier transformation is applied to the synthesizing portion 103 will be described. As the creation method for the synthetic image by the synthesizing portion 103, various creation methods are available. For example, a method for creating the synthetic image information by color difference modulation and superimpose processing described in the third embodiment can be applied to the synthesizing portion 103.

The print portion 104 records (prints) synthetic image information created by the synthesizing portion 103 on a recording medium (medium). That is, the print portion 104 creates a printed material 105 by recording (printing) the synthetic image information on the recording medium. For example, the print portion 104 is achieved by control portion's controlling the printer for image formation. As the printer of the print portion 104, for example, a thermal transfer type printer is assumed. The printer of the print portion 104 described in the first embodiment is not restricted to the thermal transfer type but various printing type printers can be applied.

The inspection image input portion 106 inputs image information printed on the printed material 105. That is, the inspection image input portion 106 inputs an image of a face of a recording medium to which the synthetic image information is printed by the print portion 104 as the inspection image information. For example, the inspection image input portion 106 is achieved by control portion's controlling a scanner for reading the image information optically. In this case, the inspection image input portion 106 reads an image recorded on the printed material 105 optically and transforms the read image information to digital image information (inspection image information). The inspection image input portion 106 reads an inspection image from the printed material 105 at a reading resolution about twice or three times the resolution for the main image information. For example, if the resolution of the main image information is 300 dpi, the reading resolution for the inspection image by the inspection image input portion 106 needs to be 600 to 1200 dpi. In the meantime, the inspection image input portion 106 may be an interface for acquiring image information of the printed material 105 read by a scanner as an external device.

The identification information extracting portion 107 extracts identification information from the inspection image information inputted by the inspection image input portion 106. For example, the identification information extracting portion 107 is achieved by control portion's executing a program for identification information extraction using the memory for image storage. The aforementioned inspection image information includes a print result (synthetic image information after print) of synthetic image information in which the identification information is embedded in the main image information in an invisible state. The identification information extracting portion 107 extracts identification information by extracting a specific frequency component from the inspection image information. In this case, the specific frequency component depends on the identification information. Thus, the identification information which can be extracted as the specific frequency component is used.

The fault determining portion 108 determines any fault of an image. For example, the fault determining portion 108 is achieved by control portion's executing a program for fault determination. The fault determining portion 108 determines whether or not any fault exists in the inspection image information, based on the information which the identification information extracting portion 107 extracts as the identification information from the inspection image information. That is, principally, if the synthetic image information is printed normally on the printed material 105, the identification information extracting portion 107 extracts the identification information accurately from the inspection image information obtained from the printed material 105. Contrary to this, unless the synthetic image information is printed normally on the printed material 105 (that is, any fault exists in print), the identification information extracting portion 107 cannot extract the identification information accurately from the inspection image information obtained from the printed material 105. Therefore, the fault determining portion 108 determines whether or not any fault exists in the inspection image information by determining whether or not the identification information extracting portion 107 extracts the identification information normally, taking account of statistical error at each processing.

The display portion 109 displays a result of the processing on a display unit. For example, the display portion 109 is achieved by control portion's controlling the display unit which displays images. The display portion 109 displays a result of determination about presence or absence of any fault by the fault determining portion 108 on the display unit.

Next, a flow of processing in the image processing apparatus 100 having the above-described structure will be described schematically.

FIG. 2 is a flow chart for explaining schematically a flow of the processing in the image processing apparatus 100 according to the first embodiment.

First, the image processing apparatus 100 acquires the main image information by means of the main image acquisition portion 101 as main image information input processing (S111). The main image acquisition portion 101 supplies the acquired main image information to the synthesizing portion 103. The image processing apparatus 100 acquires identification information by means of the identification information acquisition portion 102 as identification information input processing (S112). The identification information acquisition portion 102 supplies the acquired identification information to the synthesizing portion 103. That is, the main image information and the identification information are inputted to the synthesizing portion 103. When the main image information and the identification information are supplied, the synthesizing portion 103 carries out synthetic image creation processing of generating synthetic image information by embedding the identification information in the main image information in an invisible state (S113). If the synthetic image information is created by the synthesizing portion 103, the print portion 104 carries out print processing of printing created synthetic image information on a recording medium (S114). This print processing is a processing for creating the printed material 105 based on the synthetic image information.

When the print portion 104 which prints the synthetic image information is created, the image processing apparatus 100 carries out a processing of inspecting an image printed on the printed material (S115 to S118). First, the inspection image input portion 106 carries out an inspection image input processing of inputting an image printed on the printed material 105 as an inspection image (S115). If the inspection image is inputted by the inspection image input portion 106, the identification information extracting portion 107 carries out an identification information extracting processing of extracting the identification information from the inputted inspection image (S116). For example, the identification information extracting portion 107 extracts a frequency component from the inspection image as the identification information. Based on a result of extraction of the identification information by the identification information extracting portion 107, the fault determining portion 108 carries out a fault determining processing of determining any fault in the inspection image (S117). A result of the determination on the fault by the fault determining portion 108 is reported to the display portion 109. Consequently, the display portion 109 carries out a display processing of displaying information indicating a fault in the inspection image on the display unit (S118).

Next, an example of the printed material 105 will be described.

FIG. 3 is a diagram showing an example of an ID card 131 as the printed material 105.

A personal authentication face image 132 is printed on the ID card 131 shown in FIG. 3. The face image 132 is a color multicolor image. The aforementioned face image 132 is presented by printing synthetic image information created by the image processing apparatus 100 onto a recording medium. Thus, the identification information is embedded in the face image 132 as the synthetic image information to be printed to the ID card 131.

In other words, the face image 132 printed on the ID card 131 is an image which is an inspection object for any fault in the print processing. That is, the inspection image input portion 106 inputs the inspection image by reading the ID card 131. If respective pixels of the face image 132 as the synthetic image information are printed normally in the print processing to the ID card 131, the identification information extracting portion 107 extracts the identification information normally. Contrary to this, if any fault exists in print of the respective pixels of the face image 132 as the synthetic image information, the identification information extracting portion 107 cannot extract identification information in a complete state. Thus, the fault determining portion 108 determines any fault in the face image 132 contained in an inspection image obtained from the ID card 131, based on a result of the extraction of the identification information by the identification information extracting portion 107.

If it is determined that a fault exceeding a predetermined standard exists, that ID card 131 is taken as an object for procedure for reissue. If no fault exists or it is determined that the fault is below the predetermined standard, the ID card 131 can be used as it is. The standard for determining whether or not the card should be reissued may be set appropriately corresponding to an operating style. For example, as the standard for determining whether or not the ID card should be reissued, it is permissible to make a setting in which a fault in an image on the background of the face image for personal authentication is permitted while a fault in an image in an area other than the background (face portion) should not be permitted.

Next, identification information will be described.

Figure 4B:
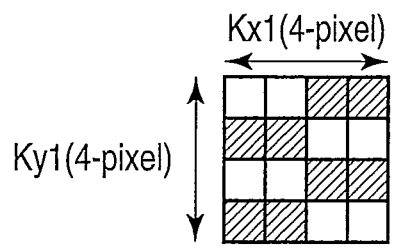

FIGS. 4A and 4B are diagrams showing an example of the identification information. FIG. 4A expresses the identification information by binary number of 16 digits. FIG. 4B shows binary image obtained by transforming "0" of the identification information shown in FIG. 4A to white pixel and transforming "1" to black pixel. In other words, FIG. 4B shows identification image information obtained by transforming the identification information into binary image. That is, the identification information shown in FIG. 4A and the identification image information shown in FIG. 4B indicate the same information. The example shown in FIG. 4B assumes to create identification image information by transforming the binary number to binary image. The identification image information may be any information as long as it is extracted by the identification information extracting processing. For example, the identification image information may use a geometric pattern image generated directly. Further, as the identification information, a predetermined value may be used or the identification information may be generated from pseudo random number. Further, to obtain the identification information, a specific word (for example, information relating to personal authentication) may be transformed to binary number, for example, by transformation to ASCII code.

Next, synthetic image creation processing by the synthesizing portion 103 will be described.

Figure 5:
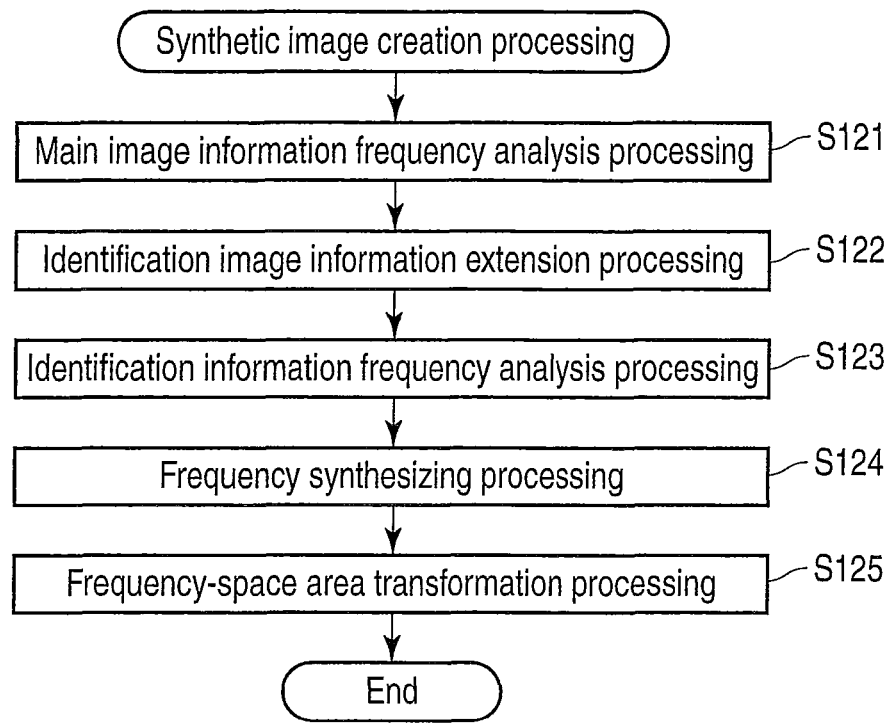
FIG. 5 is a flow chart for explaining a flow of processing as synthetic image creation processing.

FIG. 5 is a flow chart for explaining a flow of a processing as the synthetic image creation processing.

First, the synthesizing portion 103 carries out a frequency analysis processing (main image analysis processing) for the main image information (S121). The synthesizing portion 103 carries out FFT (discrete Fourier transform) processing on the main image information supplied from the main image acquisition portion 101 as an main image analysis processing. According to the FFT processing, the main image information is transformed from a real space area to a frequency area. When the main image information is transformed to the frequency area, the synthesizing portion 103 carries out an extension processing (extension processing of the identification information) on the identification image information supplied from the identification information acquisition portion 102 (S122). The extension processing is a processing of extending the identification image information corresponding to the image area of the main image information.

Figure 6:
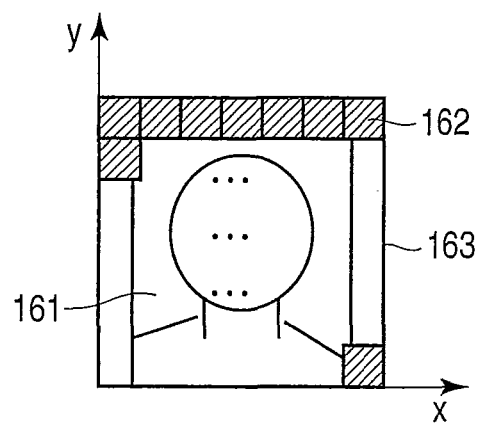
FIG. 6 is a diagram for explaining an example of expansion processing of identification image information.

FIG. 6 is a diagram for explaining an example of the extension processing of the identification image information.

In the example shown in FIG. 6, a small area 162 of the identification image information of a smaller size than the size of the main image information 161 is regarded as individual tile. In this case, the extension processing arranges and places the small areas 162 of the identification image information regarded as the tile uniformly and cyclically in an area of the same size as the image area of the main image information 161. The entire identification image information group arranged in the area of the same size as the main image information 161 turns to be the extended identification image information 163. The extension processing shown in FIG. 6 is carried out to match the size of the main image information with the size of the identification image information in a real space. However if the size of the main image information is not matched with the size of the identification image information in the real space, as the extension processing, the frequency side may be changed so that the image sizes in the real space are matched in the frequency area.

When the identification information is extended to match with the size of the main image information, the synthesizing portion 103 carries out a frequency analysis processing (analysis processing of the identification information) on the extended identification image information (extended identification image information) (S123). The synthesizing portion 103 carries out FFT (discrete Fourier transform) processing on the extended identification image information as an analysis processing of the identification information. By such a FFT processing, the identification image information is transformed from the real space area to the frequency area.

When the identification image information is transformed to the frequency area, the synthesizing portion 103 carries out a processing (synthesizing processing) of synthesizing the main image information with the identification image information (S124). The aforementioned synthesizing processing is a processing of summing up the main image information transformed to the frequency area and the identification image information transformed to the frequency area. Consequently, the synthesizing processing creates synthetic image information of the frequency area.

Generally, in the FFT (Fourier transform) processing, linearity is established. For the reason, it comes that two kinds of the functions summed up in the frequency area are summed up in a real space. That is, it means that the main image information and the extended identification image information are summed up (synthesized) in the real space area in the synthetic processing.

When the synthetic image information of the frequency area is created by the synthetic processing, the synthesizing portion 103 carries out a processing (area transformation processing) of transforming the synthetic image information of the frequency area to the synthetic image information of the real space (S125). The area transformation processing is a processing of transforming the frequency area to the real space area. For example, the synthesizing portion 103 carries out I-FFT processing (inverse discrete Fourier transform processing) on the synthetic image information in the frequency area. I-FFT processing (inverse discrete Fourier transform processing) is a processing of transforming an image in the frequency area to an image in the real space. Thus, the synthesizing portion 103 transforms the synthetic image information in the frequency area to the synthetic image information in the real space area by the above-described area transformation processing.

Here, it is assumed that the main image information is src (x, y), the extended identification image information is id (x, y), the synthetic image information is dst (x, y), the FFT processing result of the main image information is SRC (fx, fy), the FFT processing result of the extended identification image information is ID (fx, fy) and the FFT processing result of the synthetic image information is DST (fx, fy). In this case, it can be considered that each processing shown in FIG. 5 corresponds to each arithmetic operation expressed in (A-1) to (A-4) described below.

Frequency analysis processing to the main image information of S121 (main image analysis processing):

$$src(x,y) \to [\text{FFT processing}] \to SRC(fx,fy) \quad \text{(A-1)}$$

Frequency analysis processing to the identification image information of S123 (identification information analysis processing):

$$id(x,y) \to [\text{FFT processing}] \to ID(fx,fy) \quad \text{(A-2)}$$

Synthetic processing between the main image information and the extended identification image information in the frequency area of S124:

$$SRC(fx,fy)+ID(fx,fy)=DST(fx,fy) \quad \text{(A-3)}$$

Transformation processing from the frequency area to the real space area of S125:

$$DST(fx,fy) \to [I\text{-}FFT \text{ processing(inverse transform)}] \to dst(x,y) \quad \text{(A-4)}$$

(x, y) are coordinates of the real space area and (fx, fy) are coordinates of the frequency area.

Figure 7:
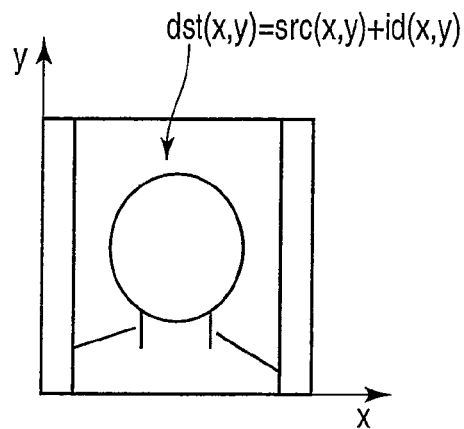
FIG. 7 is a diagram showing an example of synthetic image information in a real space area.
Figure 8:
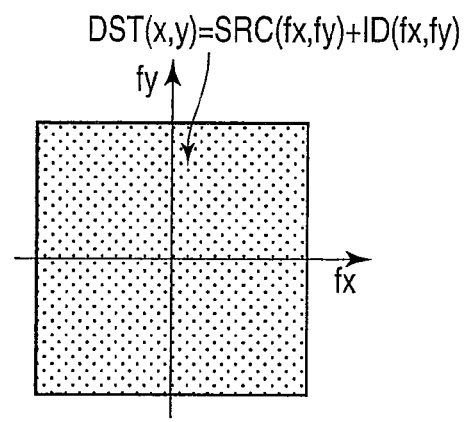
FIG. 8 is a diagram showing an example of synthetic image information in the frequency area.

FIG. 7 is a diagram showing an example of the synthetic image information in the real space area. FIG. 8 is a diagram showing an example of the synthetic image information in the frequency area. These synthetic image information pieces can be expressed in following equations (B-1) and (B-2) if the above-described equations are used. That is, the synthetic image information in the real space area shown in FIG. 7 can be expressed in an equation (B-1) and the synthetic image information in the frequency area shown in FIG. 8 can be expressed in an equation (B-2).

$$dst(x,y)=src(x,y)+id(x,y) \quad \text{(B-1)}$$

$$DST(fx,fy)=SRC(fx,fy)+ID(fx,fy) \quad \text{(B-2)}$$

Next, the identification information extraction processing will be described in detail.

The identification information extracting portion 107 extracts the identification image information from the inspection image which is an image read from the printed material 105 as an identification information extraction processing corresponding to the S116. As a method for extracting the identification image information from the inspection image in the identification information extracting portion 107, the frequency filter may be used. In this case, the identification information extracting portion 107 calculates the coefficient of a frequency filter corresponding to the identification image information in following (1) to (4). In the meantime, the calculation of the coefficient may be carried out preliminarily so as to store its result or it may be executed before the extraction processing or each time of the extraction processing.

(1) Expanding/contracting the size of the identification image information based on the resolution of the inspection image
(2) Distributing in the frequency area by Fourier transform
(3) Adjusting the passage area of a filter by referring to distributed values
(4) Adopting a value obtained by executing Fourier inverse transform to an adjusted value as the coefficient of the frequency filter The coefficient of the frequency filter is used to extract the frequency component of the identification image information. Here, the identification information extracting portion 107 executes a convolution integral indicated in an equation (C-1) in order to extract a frequency component Ik (x, y) of the identification image information from the inspection image I (x, y) using a frequency filter coefficient g (u, v). Where u, v are variables for integral.

$$Ik(x,y) = \Sigma\Sigma(g(u,v) \cdot I(x-u, y-v)) \quad \text{(C-1)}$$

For the identification information extracting portion 107, the method for extracting a specific space frequency component which is a frequency component of the identification image information is not limited to the above-mentioned method using the spatial frequency filter. For example, the identification information extracting portion 107 may use a method of extracting the frequency component of the identification image information by mapping after the mapping is carried out to another space temporarily using the Fourier transform or wavelet transform.

The identification image information is reformed from the frequency component of the identification image information extracted by the identification information extracting portion 107. That is, in the reformation processing for the identification image information from the extracted frequency component, binarization processing is carried out to an obtained extraction result using a predetermined threshold Th. Consequently, a binary image indicating a distribution of the frequency component of the extracted identification image information can be reformed. That is, if all the frequency components of the identification image information embedded in the synthetic image information is extracted normally, the binary image in which the original identification image information is reformed in a complete condition by the above-described reformation processing can be obtained.

Next, the fault determining processing will be described in detail.

The fault determining portion 108 determines a fault in the inspection image as a fault determining processing corresponding to the S117. The identification information extracting portion 107 obtains the binary image which indicates a distribution of the identification image information in the entire main image area of the inspection image as a result of the identification information extraction processing. In this case, the fault determining portion 108 is supplied with the binary image which indicates the distribution of the identification image information extracted from the inspection image.

The identification image information is distributed uniformly and cyclically in the entire main image (synthetic image) area of the inspection image. Here, it is assumed that the distribution of the identification image information in the main image (synthetic image) area is set preliminarily. The inspection image is an image data obtained by reading, by a scanner, a recording medium on which the synthetic image information having the identification information embedded in the main image information is printed. Therefore, if the print processing is terminated normally, the distribution of the identification image information in the main image (synthetic image) area of the inspection image becomes equal to the distribution of the identification image information in the created synthetic image information (main image information).

The fault determining portion 108 divides the entire main image area of the inspection image to smaller areas and determines whether or not the distribution of the identification image information in the small area is disturbed. For example, the size of the small area is preferred to be the same as the size of the identification image information as shown in FIG. 4B or larger than that. That is, the fault determining portion 108 determines that a small area in which the disturbance of the distribution of the identification image information is over the predetermined threshold is a region having the image fault. That is, if a disturbance over the predetermined threshold or any fault exists, the fault determining portion 108 determines that any fault exists in that inspection image. The fault determining portion 108 determines that a small area in which the disturbance of the distribution of the identification image information is below the predetermined threshold is an area in which the identification image information is embedded normally. That is, if the disturbance of the distribution of the identification information in all the small areas is below the threshold, the fault determining portion 108 determines that no fault exists in the inspection image.

Figure 9:
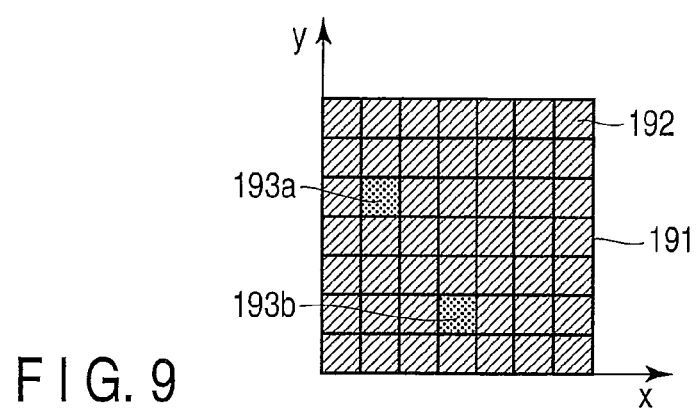
FIG. 9 is a diagram showing an example of distribution of identification image information.

FIG. 9 is a diagram showing an example of the distribution of the identification image information.

The entire image area shown in FIG. 9 is an extended identification image information area 191. Each small area shown in FIG. 9 indicates a state in which the identification image information is extracted. A small area 192 with shaded portion in the distribution example shown in FIG. 9 is an area in which the distribution of the identification image information is not disturbed. Small areas 193$a$, $b$ having dots in the distribution example shown in FIG. 9 are areas in which the distribution of the identification image information is disturbed. In this case, the fault determining portion 108 determines that the small areas 193$a$, 193$b$ are areas in which the distribution of the identification image information is disturbed, that is, areas having any image fault.

As described above, the image processing apparatus 100 of the first embodiment can detect image faults such as missing of a color or color unevenness accurately based on a result of the extraction of the identification image information in the invisible state embedded in the main image information in a visible state.

In the meantime, the first embodiment assumes a method of transforming the main image information and the identification image information to the frequency area as the synthetic image creation processing and then, synthesizing images converted to the frequency area. However, the above-described synthetic image creation processing is not limited to this. For example, as the synthetic image creation processing, a method of overwriting the identification image information with a color which the human being cannot perceives easily, for example, the identification image information onto the main image information directly with a yellow may be adopted. In this case, the identification information extracting portion may carry out a processing of extracting the identification image information written in yellow. With such a processing, it is considered that the same effect as the above-described embodiment can be obtained.

Next, the second embodiment will be described.

Figure 10:
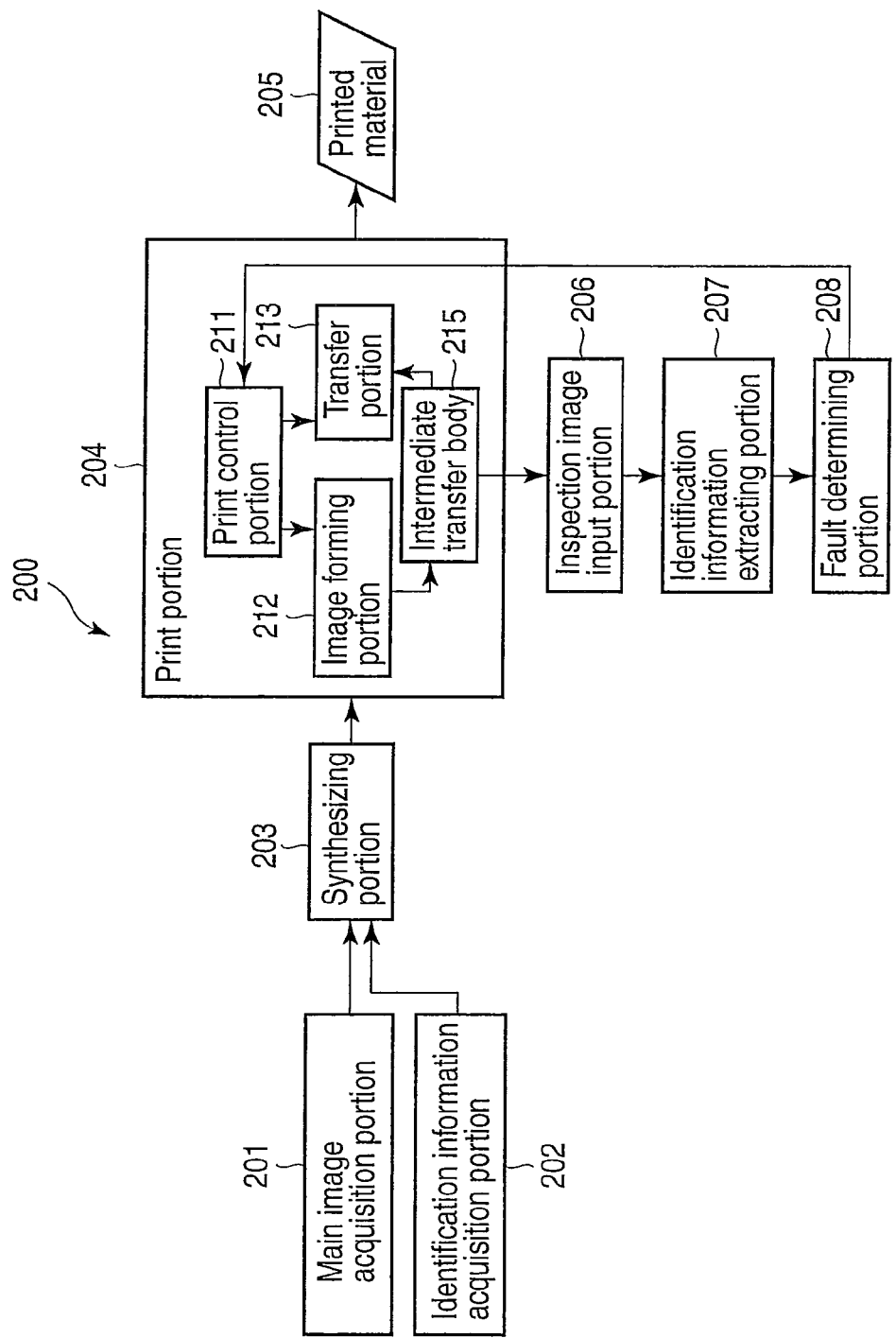
FIG. 10 is a block diagram showing schematically an example of the configuration of an image processing apparatus according to a second embodiment.

FIG. 10 is a block diagram showing schematically an example of the configuration of an image processing apparatus 200 according to the second embodiment.

As shown in FIG. 10, the image processing apparatus 200 includes a main image acquisition portion 201, an identification information acquisition portion 202, a synthesizing portion 203, a print portion 204, an inspection image input portion 206, an identification information extracting portion 207, and a fault determining portion 208. These respective portions are realized by control portion's (not shown) executing a control program. The main image acquisition portion 201, the identification information acquisition portion 202, the synthesizing portion 203, the inspection image input portion 206, the identification information extracting portion 207, and the fault determining portion 208 can be realized with those having the same functions as the main image acquisition portion 101, the identification information acquisition portion 102, the synthesizing portion 103, the identification information extracting portion 107 and the fault determining portion 108. For the reason, a detailed description of the main image acquisition portion 201, the identification information acquisition portion 202, the synthesizing portion 203, the inspection image input portion 206, the identification information extracting portion 207 and the fault determining portion 208 is omitted.

The print portion 204 has a print control portion 211, an image forming portion 212 and a transfer portion 213. The print control portion 211 controls each portion in the print portion 204. The print control portion 211 controls an operation of the image forming portion 212 or the transfer portion 213 corresponding to a signal from outside.

The image forming portion 212 forms an image on an intermediate transfer body (medium) 215. In the image processing apparatus 200 of the second embodiment, the image forming portion 212 forms a synthetic image information created by the synthesizing portion 203 by synthesizing the main image information with the identification information on the intermediate transfer body 215. The intermediate transfer body 215 has a specialized image receiving layer in which an image is formed by the image forming portion 212. The transfer portion 213 transfers an image formed on the intermediate transfer body 215 to a recording medium. That is, the intermediate transfer body 215 is a medium which holds an image to be transferred to a recording medium which is created as the printed material 205.

The above-described image recording method in the print portion 204 is generally called intermediate transfer recording method. Generally, the intermediate transfer recording method stabilizes an image to be recorded in the recording medium as compared with a method of forming an image directly on a (final) recording medium. Because the intermediate transfer recording method forms an image on the intermediate transfer medium 215 having a specialized image receiving layer, the image is stabilized regardless of a transfer surface of the (final) recording medium.

In the image processing apparatus 200, the inspection image input portion 206 inputs an image formed on the intermediate transfer body 215 within the print portion 204 as an inspection image. The basic structure of the inspection image input portion 206 is the same as the inspection image input portion 106. That is, the inspection image input portion 206 is realized by control portion's controlling a scanner for reading an image formed on the intermediate transfer body 215. Further, the inspection image input portion 206 reads an inspection image from the intermediate transfer body 215 at a resolution about twice or three times the resolution for the main image information.

The identification information extracting portion 207 extracts the identification information from the inspection image (image formed on the intermediate transfer body 215) inputted by the inspection image input portion 206. The fault determining portion 208 determines whether or not any fault exists in the inspection image (image formed on the intermediate transfer body 215) based on a result of the extraction of the identification information by the identification information extracting portion 207. The fault determining portion 208 supplies a result of the fault determination to the print control portion 211 in the print portion 204.

Next, a flow of processing in the image processing apparatus 200 having the above-described structure will be described schematically.

Figure 11:
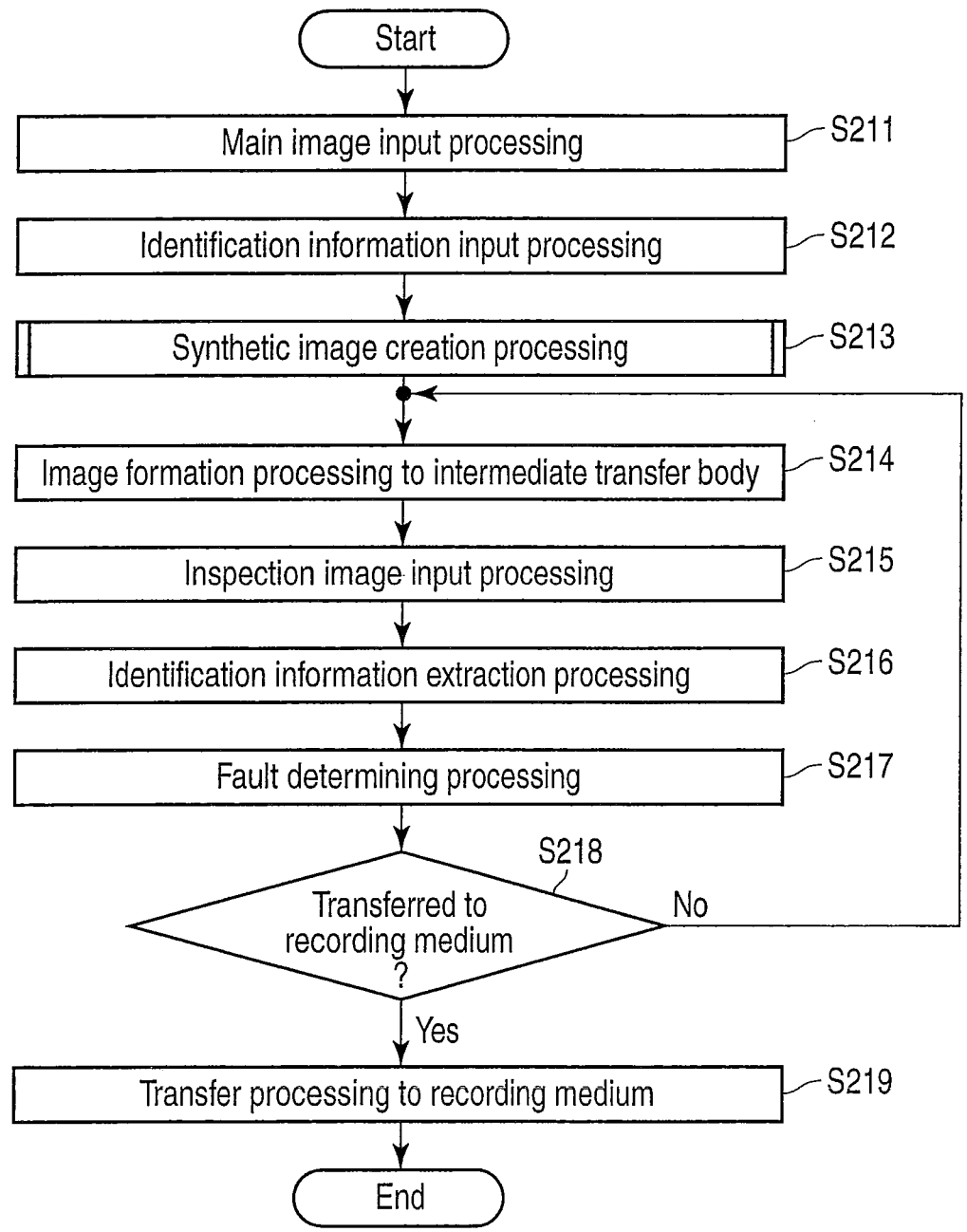
FIG. 11 is a flow chart for explaining schematically a flow of processing in the image processing apparatus according to the second embodiment.

FIG. 11 is a flow chart for explaining a flow of the processing in the image processing apparatus 200 according to the second embodiment schematically. The respective processing which the image processing apparatus 200 executes as shown in FIG. 11 includes the same processing which the image processing apparatus 100 executes. The respective processing of S211-S213 and S216-S217 shown in FIG. 11 are similar processing to S111-S113 and S116-S117. Thus, a detailed description of the respective processing of the S211-S213 and S216-S217 is omitted.

The image processing apparatus 200 acquires the main image information by means of the main image acquisition portion 201 as main image information input processing (S211). The image processing apparatus 200 acquires the identification information by means of the identification information acquisition portion 102 as an identification information input processing (S212). The synthesizing portion 203 carries out a synthetic image creation processing of generating the synthetic image information by embedding the identification information in an invisible state in the main image information (S213). The synthetic image information created by the synthesizing portion 203 is supplied to the print portion 204. In the print portion 204, the print control portion 211 stores the synthetic image information in a memory (not shown).

The print control portion 211 carries out the image forming processing of forming the synthetic image information on the intermediate transfer body 215 (S214). When a synthetic image is formed on the intermediate transfer body 215, the image processing apparatus 200 executes a processing of inspecting an image formed on the intermediate transfer body 215 (S215-S217). First, the inspection image input portion 206 carries out an inspection image input processing of inputting an image formed on the intermediate transfer body 215 as an inspection image (S215). When the inspection image is inputted by the inspection image input portion 206, the identification information extracting portion 207 carries out an identification information extraction processing of extracting the identification information from the inputted inspection image (S216). As described in the first embodiment, the identification information extracting portion 207 extracts a frequency component as the identification information from the inspection image. Based on a result of the extraction of the identification information by the identification information extracting portion 207, the fault determining portion 208 carries out a fault determining processing of determining a fault in the inspection image (S217). A result of the determination for the fault by the fault determining portion 208 is reported to the print control portion 211 in the print portion 204.

When a fault determination result is received from the fault determining portion 208, the print control portion 211 determines whether or not an image formed on the intermediate transfer body 215 is to be transferred to a recording medium (S218). As for this determination, whether or not an image is transferred to the recording medium is determined depending on whether or not any fault is detected in the image (inspection image) formed on the intermediate transfer body 215. Unless any fault is detected from the image formed on the intermediate transfer body 215, the print control portion 211 determines that the image formed on the intermediate transfer body 215 is transferred to the recording medium (S218, YES).

If it is determined that the image formed on the intermediate transfer body 215 is transferred to the recording medium (S218, YES), the print control portion 211 transfers an image formed on the intermediate transfer body 215 by the transfer portion 213 to the recording medium (S219). Consequently, the print portion 204 creates the printed material 205 to which the image formed on the intermediate transfer body 215 is transferred.

If the fault determining portion 208 detects any fault from the image formed on the intermediate transfer body 215, the print control portion 211 determines that the image formed on the intermediate transfer body 215 is not transferred to the recording medium (S218, NO). If it is determined that the image formed on the intermediate transfer body 215 is not transferred to the recording medium (S218, NO), the print control portion 211 executes the image formation processing of forming the synthetic image information created by the synthesizing portion 103 on the intermediate transfer body 215. In this case, the print control portion 211 abandons the image formed on the intermediate transfer body 215 and executes the processing from the S214 again.

According to the second embodiment, as described above, any image fault such as missing of a color is judged on the image formed on the intermediate transfer body on a stage before the final printing onto the recording medium. If a fault exists on the image formed on the intermediate transfer body as a result of this fault determination, the image formed on the intermediate transfer body is abandoned and the image formation processing is carried out to the intermediate transfer body again. As a result, a fault in the image formed on the intermediate transfer body can be detected accurately. Further, if a fault in the image formed on the intermediate transfer body is detected, the transfer of the image to the final recording medium is blocked. Thus, the transfer of the image having the fault to the final recording medium can be prevented. Consequently, wasteful abandonment of a final recording medium (for example, recording medium incorporating an IC chip) is eliminated, thereby reducing an economic loss.

As the image recording method, thermal transfer recording method using a thermal head is available. The thermal transfer recording method is affected easily by dust or dirt adhering between the image receiving layer and an ink ribbon or between the thermal head and the ink ribbon. If the thermal transfer recording method is affected by dust and dirt, a possibility that an image fault such as missing of color, in which a desired color cannot be obtained, is raised. Therefore, the image processing apparatus which adopts the thermal transfer recording method at its print portion can improve the quality and processing efficiency by the above-described image fault inspection.

Next, the third embodiment will be described.

FIG. 12 is a block diagram showing schematically an example of the configuration of an image processing apparatus 300 according to the third embodiment.

As shown in FIG. 12, the image processing apparatus 300 includes a main image acquisition portion 301, an auxiliary information acquisition portion 302, a key information acquisition portion 309, a synthesizing portion 303, a print portion 304, an inspection image input portion 306, a carrier extracting portion 307 and a fault determining portion 308. These respective portions are realized by control portion's (not shown) executing a control program. The main image acquisition portion 301, the print portion 304, the inspection image input portion 306, and the fault determining portion 308 can be realized with those having the same functions as the main image acquisition portion 201, the print portion 204, the inspection image input portion 206 and the fault determining portion 208. For the reason, a detailed description of the print portion 304, the inspection image input portion 306 and the fault determining portion 308 is omitted.

The auxiliary information acquisition portion 302 acquires auxiliary information to be embedded in the main image information. For example, the auxiliary information acquisition portion 302 is realized by the control portion's controlling an interface for the auxiliary information input. The auxiliary information acquired by the auxiliary information acquisition portion 302 is information for raising the security performance of the main image information. The auxiliary information is information which is a fundamental for digital watermarking which is to be embedded in the main image information. The auxiliary information may be memorized preliminarily in a memory (not shown) in the image processing apparatus 300 or may be supplied to the image processing apparatus 300 from an external unit.

The key information acquisition portion 309 acquires key information for use in embedding the auxiliary information in the main image information. For example, the key information acquisition portion 309 is realized by the control portion's controlling an interface for key information input. In the meantime, the key information may be memorized preliminarily in a memory (not shown) in the image processing apparatus 300 or may be supplied to the image processing apparatus 300 from an external unit. The key information acquired by the key information acquisition portion 309 is used for embedding the auxiliary information in the main image information and further, for recovering the auxiliary information from the synthetic image information.

The synthesizing portion 303 creates the synthetic image information in which the auxiliary information in an invisible state is embedded in the main image information in the visible state using the key information. That is, in the synthetic image information, only the main image information can be made visible. For example, the synthesizing portion 303 is realized by the control portion's executing a program for image processing (image synthesizing processing) using a memory for memorizing the image information. The synthesizing portion 303 creates the synthetic image information according to the digital watermarking method making use of human visual feature to color difference. This digital watermarking method will be described later.

The print portion 304 has the same structure as the print portion 204. The print portion 304 has a print control portion 311, an image forming portion 312, a transfer portion 313 and an intermediate transfer body 315. The print control portion 311, the image forming portion 312, the transfer portion 313 and the intermediate transfer body 315 have the same functions as the print control portion 211, the image forming portion 212, the transfer portion 213 and the intermediate transfer body 215. That is, the print control portion 311 controls the operation of each portion in the print portion 304. The image forming portion 312 forms an image such as synthetic image information on the intermediate transfer body 315. The transfer portion 313 transfers the image formed on the intermediate transfer body 315 to a recording medium.

The inspection image input portion 306 has the same structure as the inspection image input portion 206. That is, the inspection image input portion 306 inputs an image formed on the intermediate transfer body 315 in the print portion 304 as an inspection image.

The carrier extracting portion 307 extracts a digital watermarking carrier signal from the inspection image (image formed on the intermediate transfer body 215) inputted by the inspection image input portion 306. The carrier extracting portion 307 extracts a digital watermarking carrier signal from the aforementioned inspection image using the key information used upon creating the synthetic image information.

The fault determining portion 308 determines whether or not any fault exists in the inspection image (image formed on the intermediate transfer body 315) based on a result of the extraction of the carrier signal in the carrier extracting portion 307. The fault determining portion 308 supplies a result of the fault determination to the print control portion 311 in the print portion 304.

The carrier signal is information which indicates the auxiliary information embedded in the main image information. Thus, if the carrier signal is extracted from the inspection image normally, the auxiliary information embedded in the main image information is restored to a complete condition. In other words, any inspection image by which the auxiliary information cannot be restored to a complete condition can be judged to be in a state having a fault which disables the complete carrier signal from being detected.

Next, a flow of the processing in the image processing apparatus 300 having the above-described structure will be described schematically.

Figure 13:
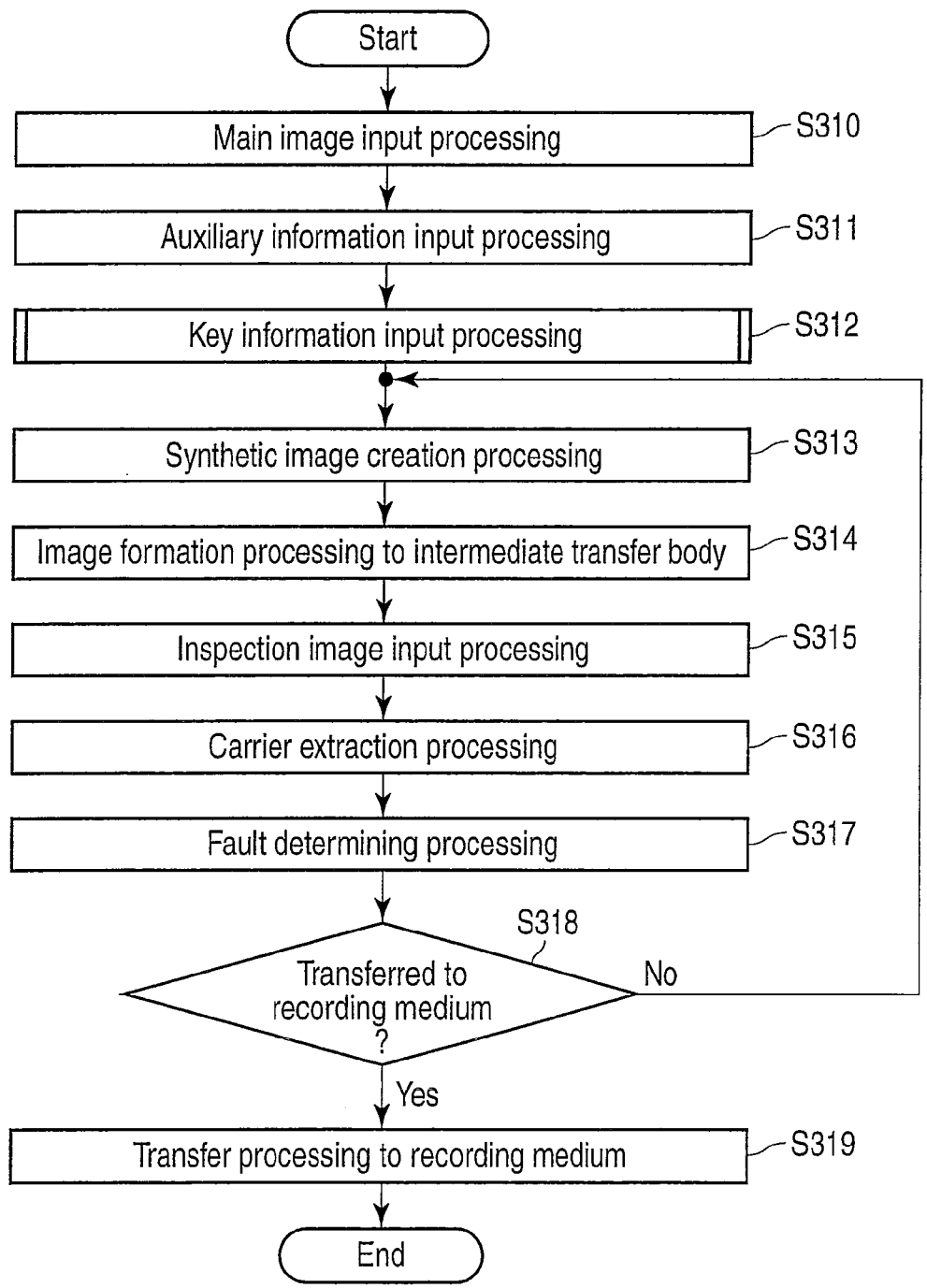
FIG. 13 is a flow chart for explaining schematically a flow of processing in the image processing apparatus according to the third embodiment.

FIG. 13 is a flow chart for explaining a flow of the processing in the image processing apparatus 300 according to the third embodiment schematically. In the meantime, the respective processing which the image processing apparatus 300 execute as shown in FIG. 13 include the same processing as those that the image processing apparatus 100 or the image processing apparatus 200 executes. The respective processing of S310, S314-S315 and S318-S319 shown in FIG. 13 are similar processing to S210, S214-S215 and S218-S219. Thus, a detailed description of the respective processing of the S310, S314-S315 and S318-S319 is omitted.

First, the image processing apparatus 300 acquires the main image information by means of the main image acquisition portion 301 as a main image information input processing (S310). The image processing apparatus 300 acquires the auxiliary information by means of the auxiliary information acquisition portion 302 as an auxiliary information input processing (S311). Further, the image processing apparatus 300 acquires the key information by means of the key information acquisition portion 309 as a key information input processing (S312). The auxiliary information and the key information are supplied to the synthesizing portion 303 together with the main image information.

The synthesizing portion 303 carries out a synthetic image creation processing of creating the synthetic image information by embedding the auxiliary information in the invisible state into the main image information in the visible state using the key information (S313). The synthetic image information created by the synthesizing portion 303 is supplied to the print portion 304. In the print portion 304, the print control portion 311 stores the synthetic image information in a memory (not shown).

The print control portion 311 carries out an image forming processing of forming the synthetic image information on the intermediate transfer body 315 (S314). If a synthetic image is formed on the intermediate transfer body 315, the image processing apparatus 300 carries out a processing of inspecting an image formed on the intermediate transfer body 315 (S315 to S317). First, the inspection image input portion 306 carried out an inspection image input processing of inputting an image formed on the intermediate transfer body 315 as an inspection image (S315). If the inspection image is inputted by the inspection image input portion 306, the carrier extracting portion 307 carries out a carrier extraction processing of extracting a digital watermarking carrier signal from the inspection image using the key information obtained from the key information acquisition portion 309 (S316). The carrier signal extracted by the carrier extracting portion 307 is information which indicates the auxiliary information embedded in the main image information. Based on a result of the extraction of the identification information by the carrier extracting portion 307, the fault determining portion 308 carries out a fault determining processing of determining a fault in the inspection image (S317). A result of the determination for the fault by the fault determining portion 308 is reported to the print control portion 311 in the print portion 304.

When the result of the fault determination is received from the fault determining portion 308, the print control portion 311 determines whether or not the image formed on the intermediate transfer body 315 should be transferred to the recording medium (S318). For example, the print control portion 311 determines whether or not the image formed on the intermediate transfer body 315 should be transferred to the recording medium depending on whether or not any fault is detected from the image formed on the intermediate transfer body 315.

If any fault is detected from the image formed on the intermediate transfer body 315, that is, it is determined that the image formed on the intermediate transfer body 315 should be transferred to the recording medium (S318, YES), the print control portion 311 transfers the image formed on the intermediate transfer body 315 to the recording medium by means of the transfer portion 313 (S319). Consequently, the print portion 304 creates the printed material 305 by transferring the synthetic image formed on the intermediate transfer body 315.

If a fault is detected from an image formed on the intermediate transfer body 315, that is, it is determined that the image formed on the intermediate transfer body 315 is not transferred to the recording medium (S318, NO), the print control portion 311 executes an image formation processing of forming the synthetic image information created by the synthesizing portion 303 on the intermediate transfer body 315. In this case, the print control portion 311 abandons the image formed on the intermediate transfer body 315 and executes the processing from the S314 again.

The above-mentioned image processing apparatus 300 creates the printed material 305 to which the synthetic image information, in which the auxiliary information in the invisible state is embedded in the main image information in the visible state, is printed. That is, when the synthetic image information is printed on the recording medium, the auxiliary information is in the invisible state. Thus, the printed material 105 created by the image processing apparatus 100 and the printed material 305 created by the image processing apparatus 300 are apparently the same. For example, the image processing apparatus 300 can create the same one as the printed material 131 shown in FIG. 3 in terms of the apparent structure.

The image processing apparatus 300 of the third embodiment can use personal control information such as ID number, name, birth date, expiration date as the auxiliary information in order to improve the security performance. The printed material 305 which uses the personal identification information as the auxiliary information relates the auxiliary information which is restored from the synthetic image information such as the face image with the personal control information. Consequently, it is difficult to modify or forge part of the ID certificate, thereby intensifying the security performance.

Next, the key information will be described in detail.

FIGS. 14A and 14B are diagrams showing an example of the key information.

FIG. 14A is a diagram which expresses the key information with binary number of 16 digits. FIG. 14B is a binary image as a result of transforming "0" of the key information shown in FIG. 14A to white pixels and "1" to black pixels. In other words, FIG. 14B shows the key image information obtained by transforming the key information to the binary image. Essentially speaking, the key information shown in FIG. 14A and the key image information shown in FIG. 14B indicate the same information. An example shown in FIG. 14B assumes creation of the identification image information by transforming the binary number to the binary image. However, the key image information is not limited to the binary number transformed to the binary image. For example, the key image information can use a geometric pattern image directly generated. As the key information, a predetermined value may be used or it may be generated from a pseudo random number. Further, to obtain the key information, a specific word (for example, information relating to personal authentication) may be transformed to binary number, for example, by transformation to ASCII code.

Next, the digital watermark embedding processing of the synthesizing portion 303 will be described.

The digital watermark embedding processing using the color difference and superimpose processing can be applied to the synthesizing portion 303. An example of the digital watermark embedding processing using the color difference and superimpose processing has been disclosed in, for example, Jpn. Pat. Appln. KOKAI Publication No. 11-168616.

The digital watermark embedding processing using the color difference and superimpose processing uses following characteristics.

(1) Using the Human Visual Feature

As the image frequency rises, tone identification performance drops.

Color difference information is harder to distinguish than brightness information.

(2) Using the Relation of Physical Complementary Color

For example, in case of additive color mixing, red+cyan look achromatic color (white).

(3) Adopting the relation of complementary color and color difference information to high frequency carrier pattern image (color difference modulation processing)

That is, red and cyan are in the relationship of complementary colors. For the reason, if red and cyan are adjacent to each other, they are hard to distinguish with the human eyes so that they look achromatic color. If red rich pixels and cyan rich pixels are arranged repeatedly by using the high frequency carrier pattern image, differences of these fine color difference cannot be distinguished with the human eyes. As a result, the amount of color difference is determined to zero as a result of plus-minus with the human visual feature.

The digital watermark embedding processing using the color difference and superimpose processing as described above enables the auxiliary information to be embedded in the main image information in the invisible state without inducing deterioration of the quality.

FIG. 15 is a diagram showing an example of the digital watermark embedding processing using the superimpose processing.

Next, the color difference modulation processing in the digital watermark embedding processing will be described.

The color difference modulation processing is a processing of creating the embedded information. That is, the embedded information is created by executing color difference modulation processing on the key image information created from the key information.

$$KEY(x,y)=\text{in case of white pixel} \rightarrow EMD(x,y)-R=+\Delta CD-R \quad \text{(D-1)}$$

$$EMD(x,y)-G=-\Delta CD-G \quad \text{(D-2)}$$

$$EMD(x,y)-B=-\Delta CD-B \quad \text{(D-3)}$$

$$KEY(x,y)=\text{in case of black pixel} \rightarrow EMD(x,y)-R=-\Delta CD-R \quad \text{(D-4)}$$

$$EMD(x,y)-G=+\Delta CD-G \quad \text{(D-5)}$$

$$EMD(x,y)-B=+\Delta CD-B \quad \text{(D-6)}$$

KEY (x, y): key image information
EMD (x, y): embedded information (result of color difference modulation processing)
$\Delta$CD: amount of color difference As a result of the above-described color difference modulation processing, a portion corresponding to the white pixel in the key image information turns R-rich (red component rich) and a portion corresponding to the black pixel turns C-rich (cyan component rich). Red and cyan are in the relationship of physical complementary colors. Thus, if both of them are summed up, achromatic color is produced. Thus, by setting the pixel pitch to a high resolution (about 300 dpi or more) exceeding a range which the human eyes can perceive, the embedded information which is a result of the color difference modulation processing disables red and cyan to be distinguished with the naked eyes, so that achromatic color (gray) is produced. In the color difference modulation processing, by using this feature, the key information pattern can be replaced with the achromatic color information apparently. In the meantime, the above-mentioned equation executes such a color difference modulation that the key image information turns to cyan component rich in case of white pixel and red component rich in case of black pixel. However, such a relation is relative. Thus, there is no problem principally even if the cyan component rich and the red component rich are reversed.

Next, the superimpose processing in the digital watermark embedding processing will be described.

The superimpose processing is a processing of superimposing the embedded information obtained by the color difference modulation processing on the main image information. The main image information, embedded information (for superimpose) and synthetic image information on coordinates (x, y) of an image are defined as follows.

$$\text{main image information: } SRC-C(x,y) \ldots \text{corresponds to 351 of FIG. 15} \quad \text{(E-1)}$$

$$\text{embedded information(for superimpose):} EMD-C(x,y) \\ \ldots \text{corresponds to 352 of FIG. 15} \quad \text{(E-2)}$$

$$\text{synthetic image information:} DES-C(x,y) \ldots \text{corresponds to 353 of FIG. 15} \quad \text{(E-3)}$$

x, y are coordinate values of an image (the coordinate sizes are assumed to be the same)
C={R (red), G (green), B (blue)}, which indicates a plain
In case of 24 bit color arithmetic operation, each value is an integer value of 0 to 255.
The superimpose processing on the coordinates (x, y) is expressed in following equations (F-1) to (F-3).

$$DES-R(x,y)=SRC-R(x,y)+EMD-R(x,y) \quad \text{(F-1)}$$

$$DES-G(x,y)=SRC-G(x,y)+EMD-G(x,y) \quad \text{(F-2)}$$

$$DES-B(x,y)=SRC-B(x,y)+EMD-B(x,y) \quad \text{(F-3)}$$

Next, the carrier extraction processing will be described in detail.

The carrier extracting portion 307 extracts a frequency component (digital watermarking carrier signal) of the key image information indicating the auxiliary information from the inspection image as a carrier extraction processing corresponding to the S316. As a method for extracting the carrier signal from the inspection image in the carrier extracting portion 307, the frequency filter may be used. In this case, the carrier extracting portion 307 calculates the coefficient of the frequency filter corresponding to the digital watermarking carrier signal in (1) to (4). In the meantime, the calculation of the coefficient may be carried out preliminarily to store its result or it may be executed before the extraction processing or it may be carried out each time.

(1) Expanding/contracting the size of the key image information based on the resolution of the inspection image
(2) Distributing in the frequency area by Fourier transform
(3) Adjusting the passage area of a filter by referring to distributed values
(4) Adopting a value obtained by executing Fourier inverse transform to an adjusted value as the coefficient of the frequency filter The coefficient of the frequency filter is used to extract the frequency component of the key image information. Here, the carrier extracting portion 307 executes a convolution integral indicated in an equation (G-1) in order to extract a frequency component Ik (x, y) of the key image information from the inspection image I (x, y) using a frequency filter coefficient g (u, v). Where u, v are variables for integral.

$$Ik(x,y)=\Sigma\Sigma(g(u,v) \cdot I(x-u,y-v)) \quad (G-1)$$

For the carrier extracting portion 307, the method for extracting a specific space frequency component which is a frequency component of a key image information is not limited to the above-mentioned method using the spatial frequency filter. For example, the carrier extracting portion 307 may use a method of extracting the frequency component of the key image information by mapping after the mapping is carried out to another space temporarily using the Fourier transform or wavelet transform.

Further, the key image information is reformed from the digital watermarking carrier signal extracted by the carrier extracting portion 307.

That is, the processing of reforming the key image information from the extracted frequency component carries out binarization processing using a predetermined threshold Th to an obtained extraction result. Consequently, a binary image indicating a distribution of the frequency component of the extracted key image information can be reformed. That is, if all the frequency components of the key image information embedded in the synthetic image information are extracted normally, the binary image in which the original key image information is reformed in a complete state is obtained by the above-described reformation processing.

The threshold to the digital watermarking carrier signal is affected easily by the value of the main image information if it is a fixed value. Thus, an adaptive type binarization processing of changing the threshold with surrounding values by providing a reference area (for example, 3×3 pixels) for an attention pixel is preferred.

Next, the fault determining processing will be described in detail.

The fault determining portion 308 determines a fault in the inspection image as a fault determining processing corresponding to the S317. The carrier extracting portion 307 obtains a binary image indicating a distribution of the digital watermarking carrier signal in the entire main image area of the inspection image as a result of the carrier extraction processing. Here, it is assumed that the digital watermarking carrier signal is substantially the same as the key image information. In this case, the distribution of the digital watermarking carrier signal (key image information) is known preliminarily and the carrier signals are distributed cyclically in the entire main image (synthetic image) area of the inspection image. It is assumed that the distribution of the digital watermarking carrier signal (key image information) is set preliminarily.

The inspection image is an image data obtained by reading, by a scanner, a recording medium containing the printed synthetic image information in which the auxiliary information (digital watermarking body) is embedded in the main image information in the invisible state using the key image information (digital watermarking carrier). Thus, if the print processing is carried out normally, the distribution of the digital watermarking carrier signal in the main image (synthetic image) area of the inspection image and the distribution of the digital watermarking carrier signal in the created synthetic image information (main image information) are equal to each other.

For example, the fault determining portion 308 divides the entire main image area of the inspection image to smaller areas and confirms whether or not the distribution of the digital watermarking carrier signal is disturbed in each small area. The size of the small area is preferred to be equal to or larger than the size of the key image information shown in FIG. 14B. The fault determining portion 308 determines a small area in which the disturbance of the distribution of the digital watermarking carrier signal is over a predetermined threshold to be an area having an image fault. That is, if a disturbance over the predetermined threshold or a missing exits, the fault determining portion 308 determines that a fault exists in the inspection image. Further, the fault determining portion 308 determines that the small area in which the disturbance of the distribution of the digital watermarking carrier signal is below the predetermined threshold is an area in which the digital watermarking carrier signal is embedded normally. That is, if the disturbance of the distribution of the digital watermarking carrier signal in all the small areas is below the predetermined threshold, the fault determining portion 308 determines that no fault exists in the inspection image.

Consequently, as regards a result of the print of the synthetic image information in which the auxiliary image information is embedded in the invisible state in the main image information in the visible state using the key image information, the image processing apparatus 300 of the third embodiment can detect an image fault such as missing of color and color unevenness at a high accuracy. Because the image fault can be detected with respect to the synthetic image information formed on the intermediate transfer body, an image having a fault is prevented from being transferred to the recording medium such as an IC card. Consequently, wasteful abandonment of a recording medium such as an IC card is eliminated, thereby reducing an economic loss.

Next, the fourth embodiment of the present invention will be described.

FIG. 16 is a block diagram showing schematically an example of the configuration of an image processing apparatus 400 according to a fourth embodiment.

As shown in FIG. 16, the image processing apparatus 400 includes a main image acquisition portion 401, an auxiliary information acquisition portion 402, a key information acquisition portion 409, a synthesizing portion 403, a print portion 404, an inspection image input portion 406, a carrier extracting portion 407, a fault candidate extracting portion 408 and a fault determining portion 410. These respective portions are realized by control portion's (not shown) executing a control program. The main image acquisition portion 401, the auxiliary information acquisition portion 402, the key information acquisition portion 409, the synthesizing portion 403, the print portion 404, the inspection image input portion 406, and the carrier extracting portion 407 are realized by those having the same functions as the main image acquisition portion 301, the auxiliary information acquisition portion 302, the key information acquisition portion 309, the synthesizing portion 303, the print portion 304, the inspection image input portion 306 and the carrier extracting portion 307. For the reason, a detailed description of the main image acquisition portion 401, the auxiliary information acquisition portion 402, the key information acquisition portion 409, the synthesizing portion 403, the print portion 404, the inspection image input portion 406 and the carrier extracting portion 407 is omitted.

The fault candidate extracting portion 408 extracts a fault candidate in the inspection image inputted by the inspection image input portion 406 based on a result of the extraction of the digital watermarking carrier signal by the carrier extracting portion 407. The fault candidate extracting portion 408 can be realized by the same processing as the fault determining processing described in the third embodiment. For example, as described in the third embodiment, the carrier extracting portion 407 divides the entire area of the inspection image to small areas and extracts the digital watermarking carrier signal. In this case, the fault candidate extracting portion 408 determines, by comparing with a predetermined threshold, whether or not the distribution of the digital watermarking carrier signal in each small area is disturbed. Consequently, the fault candidate extracting portion 408 extracts a small area in which the disturbance of the distribution of the carrier signal is over the predetermined threshold as a fault candidate having a possibility of the image fault.

The fault determining portion 410 determines whether or not the fault candidate extracted by the fault candidate extracting portion 408 is an image fault. As shown in FIG. 16, the fault determining portion 410 includes a comparison image creating portion 421, a position information calculating portion 422, a reference image creating portion 423 and a determining portion 424.

The comparison image creating portion 421 creates an area of the fault candidate in the inspection image as comparison image information. That is, the comparison image creating portion 421 cuts out an area of the fault candidate in the inspection image information as the comparison image information based on the position of the fault candidate extracted by the fault candidate extracting portion 408.

The position information calculating portion 422 calculates a position information corresponding to the position of a fault candidate in the synthetic image information based on the position of the fault candidate extracted by the fault candidate extracting portion 408.

The synthetic image information is image information in a state before printed. The inspection image is image information obtained by fetching an image formed physically on the intermediate transfer body 415 electronically with a scanner. Thus, in actual operations, it is considered that often, the synthetic image information and inspection image are different in terms of the resolution. For example, here it is assumed that the resolution of the synthetic image information is 300 dpi and the resolution of the inspection image is 1200 dpi. If the resolution of the synthetic image information is different from the resolution of the inspection image, the position information calculating portion 422 executes resolution transformation.

The reference image creating portion 423 creates an area corresponding to the area of a fault candidate in the image information (synthetic image information) in a state before the image is formed on the intermediate transfer body 415 as the reference image information. Based on the position information of the fault candidate in the main image information calculated by the position information calculating portion 422, the area of the fault candidate in the main image information is cut out as the comparison image information.

The determining portion 424 determines whether or not the fault candidate extracted by the fault candidate extracting portion 408 is a fault. The determining portion 424 determines whether or not the fault candidate is a fault by comparing a comparison image information created by the comparison image creating portion 421 with the reference image information created by the reference image creating portion 423. Here, as described above, it is assumed that the resolutions of the comparison image information and the reference image information meet each other and the positions of respective pixels also meet.

Next, the determining processing for the fault in the determining portion 424 will be described.

The determining portion 424 determines whether or not the fault candidate is a fault in a following procedure.

(1) The determining portion 424 transforms the RGB values of the pixels which constitute the comparison image information and the pixels which constitute the reference image information to L value, a value and b value.

(2) The determining portion 424 matches the pixels of the comparison image information with the pixels of the reference image information. The determining portion 424 calculates a color difference $\angle Ei$ ($i=1$ to n) of a corresponding pixel. The determining portion 424 regards the L value, a value and b value of a pixel i of the comparison image information as Lci, aci and bci, and the L value, a value and b value of a pixel i of the reference image information as Lbi, abi and bbi. In this case, the determining portion 424 calculates the $\angle Ei$ according to a following equation (H-1).

$$\angle Ei = (\angle Ldi2 + \angle adi2 + \angle bdi2)(1/2) \tag{H-1}$$

Based on the color differences of the respective pixels, the determining portion 424 calculates a color difference $\angle E$ between the entire comparison image information and the entire reference image information according to a following equation (H-2).

$$\angle E = (1/n)\Sigma n \angle (Ei) \tag{H-2}$$

where $\angle Ldi2$, $\angle adi2$, $\angle bdi2$ are differences on the L, a, b axes between the pixel i of the comparison image information and the pixel i of the reference image information.

(3) The determining portion 424 calculates standard deviations $\sigma B$, $\sigma C$ of the L value, a value and b value of each pixel of the comparison image information and each pixel of the reference image information.

(4) The determining portion 424 calculates a degree of separation d between the inspection image and synthetic image according to a following equation (H-3).

$$d = \Delta E/(\sigma B + \sigma C) \tag{H-3}$$

(5) If the degree of separation is over a predetermined threshold, the determining portion 424 determines that it is an image fault and if below the threshold, the determining portion 424 determines that it is not an image fault.

Next, a flow of the processing in the image processing apparatus 400 having the above described structure will be described schematically.

Figure 17:
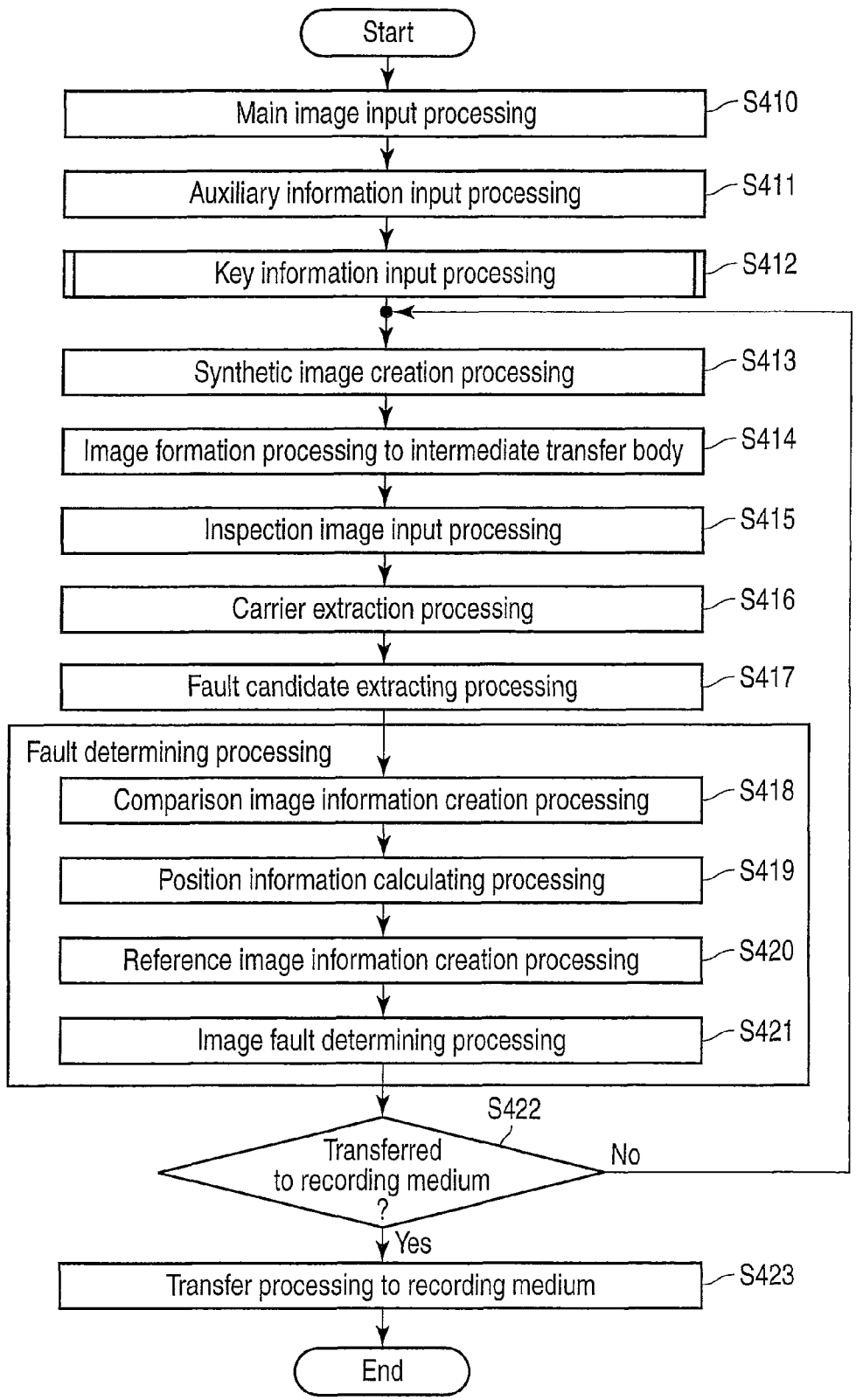
FIG. 17 is a flow chart for explaining schematically a flow of processing in the image processing apparatus according to the fourth embodiment.

FIG. 17 is a flow chart for explaining a flow of the processing in the image processing apparatus 400 according to a fourth embodiment schematically. In the meantime, the processing which the image processing apparatus 400 executes as shown in FIG. 17 include the same processing as those that the image processing apparatus 100, the image processing apparatus 200 and the image processing apparatus 300 execute. For example, the processing of S410 to S416 and S422 to S423 as shown in FIG. 16 are similar processing to those of S310 to S316 and S318 to S319 shown in FIG. 13. Thus, a detailed description of the processing of S410 to S416 and S422 to S423 is omitted.

That is, the image processing apparatus 400 acquires the main image information by means of the main image acquisition portion 401 as the main image information input processing (S410). The image processing apparatus 400 acquires the auxiliary information by means of the auxiliary information acquisition portion 402 as the auxiliary information input processing (S411). Further, the image processing apparatus 400 acquires the key information by means of the key information acquisition portion 409 as the key information input processing (S412). The auxiliary information and the key information are supplied to the synthesizing portion 403 together with the main image information.

The synthesizing portion 403 carries out a synthetic image creation processing of creating the synthetic image information by embedding the auxiliary information in the invisible state into the main image information in the visible state using the key information (S413). The synthetic image information created by the synthesizing portion 403 is supplied to the print portion 404. In the print portion 404, the print control portion 411 stores the synthetic image information in a memory (not shown).

The print control portion 411 carries out the image formation processing of forming the synthetic image information on the intermediate transfer body 415 (S414). When the synthetic image is formed on the intermediate transfer body 415, the image processing apparatus 400 carries out a processing of inspecting an image formed on the intermediate transfer body 415 (S415 to S421). First, the inspection image input portion 406 carries out an inspection image input processing of inputting the image formed on the intermediate transfer body 415 as the inspection image (S415). When the inspection image is inputted by the inspection image input portion 406, the carrier extracting portion 407 carries out a carrier extraction processing of extracting a digital watermarking carrier signal from the inspection image using the key information obtained from the key information acquisition portion 409 (S416). For example, as described above, the carrier extracting portion 407 divides the entire area of the inspection image in smaller areas and extracts the digital watermarking carrier signal.

Based on an extraction result of the digital watermarking carrier signal by the carrier extracting portion 407, the fault candidate extracting portion 408 extracts a fault candidate in the inspection image (S417). Here, the fault candidate extracting portion 408 extracts a small area in which the distribution of the digital watermarking carrier signal in the inspection image is disturbed more than a predetermined threshold, as a fault candidate having a possibility of the image fault. If the fault candidate in the inspection image is extracted, the fault determining portion 410 determines whether or not the extracted fault candidate is a fault of the image (S418 to S421).

That is, the comparison image creating portion 421 cuts out an area of the fault candidate in the inspection image information as the comparison image information based on the position of the fault candidate extracted by the fault candidate extracting portion 408 (S418). The position information calculating portion 422 calculates position information corresponding to the position of the fault candidate in the synthetic image information, based on the position of the fault candidate extracted by the fault candidate extracting portion 408 (S419). In the meantime, the position information calculating portion 422 carries out resolution transformation for matching the resolution of the inspection image information with that of the synthetic image information. The reference image creating portion 423 cuts out an area corresponding to the area of the fault candidate in the synthetic image information as the reference image information, based on the position information of the fault candidate in the synthetic image information calculated by the position information calculating portion 422 (S420).

The determining portion 424 determines whether or not the fault candidate should be adopted as the image fault by comparing the comparison image information created by the comparison image creating portion 421 with the reference image information created by the reference image creating portion 423 (S421). For example, the determining portion 424 determines whether or not the image is a fault according to the above-described fault determining procedure. The determining portion 424 reports a fault determination result to the print control portion 411.

If it is determined that no fault exists in the image formed on the intermediate transfer body 415, the print control portion 411 determines that the image formed on the intermediate transfer body 415 should be transferred to a recording medium (S422, YES). In this case, the print control portion 411 transfers the image formed on the intermediate transfer body 315 to the recording medium by means of the transfer portion 413 (S423). Consequently, the print portion 404 creates the printed material 405 to which the synthetic image formed on the intermediate transfer body 415 is transferred.

If it is determined that a fault exists in the image formed on the intermediate transfer body 415, it is determined that the image formed on the intermediate transfer body 415 is not to be transferred to the recording medium (S422, NO). In this case, the print control portion 411 carries out an image formation processing of forming the synthetic image information created by the synthesizing portion 403 on the intermediate transfer body 415. In this case, the print control portion 411 abandons the image formed on the intermediate transfer body 415 and executes the processing from the S414 again.

The image processing apparatus 400 of the fourth embodiment extracts an area of the fault candidate in the inspection image obtained by reading the intermediate transfer body in which the synthetic image information is formed, and compares the comparison image information which is an area of the fault candidate in the inspection image with the reference image information which is an area corresponding to the area of the fault candidate in the synthetic image information, so as to judge a fault in the inspection image. Consequently, whether or not the area extracted as a fault from the inspection image is an image having a fault such as missing of color or color unevenness can be determined at a high accuracy. Because the fault of the image formed on the intermediate transfer body can be judged, the fault image is prevented from being transferred to a recording medium such as an IC card. As a result, wasteful abandonment of a recording medium such as an IC card is eliminated, thereby reducing an economic loss.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method for inspecting an image, comprising:
   creating synthetic image information having a specific frequency in which information is synthesized with main image information;
   printing the synthetic image information onto a medium;
   acquiring an image printed on the medium as inspection image information;
   extracting a distribution of the specific frequency component from the inspection image acquired; and
   determining a fault in the image printed on the medium based on the distribution of the specific frequency component extracted from the inspection image.

2. The image processing method according to claim 1, wherein the distribution of the specific frequency component is extracted for each small area having a size larger than the cycle of the frequency in the inspection image, and
   the fault in the image printed on the medium is determined in the unit of the small area in the inspection image.

3. The image processing method according to claim 1, wherein the synthetic image information is created by embedding auxiliary information into the main image information in an invisible state using key information,
   the information that is extracted from the inspection image is the specific frequency component of the key information from the inspection image, and
   the fault in the image printed on the medium is determined based on the distribution of the specific frequency component of the key information extracted from the inspection image.

4. The image processing method according to claim 3, wherein the synthetic image information is embedded in the information as an achromatic color in the main image information by performing color difference modulation on the key image information created using a group of two complementary colors on the key information.

5. The image processing method according to claim 3, wherein the synthetic image information is created by embedding auxiliary information in the invisible state into the main image information by using a digital watermarking carrier signal based on the key information,
   the information that is extracted from the inspection image is based on the digital watermarking carrier signal, and
   the fault in the image printed on the medium is determined based on the distribution of the digital watermarking carrier signal extracted from the inspection image.

6. The image processing method according to claim 5, wherein the information that is extracted from the inspection image is the digital watermarking carrier signal for each small area having a size larger than the cycle of the digital watermarking carrier signal in the inspection image, and
   the fault in the image printed on the medium is determined in the unit of the small area in the inspection image.

7. The image processing method according to claim 6, wherein the determining comprises extracting an area of a fault candidate from each small area in the inspection image; and
   determining whether or not the extracted area of the fault candidate is an image fault based on a predetermined condition.

8. The image processing method according to claim 7, wherein the determining includes comparing image information in the inspection image corresponding to the extracted area of the fault candidate with image information in the synthetic image information corresponding to the extracted area of the fault candidate to determine whether or not any image fault exists.

9. The image processing method according to claim 1, wherein the synthetic image information is printed on an intermediate transfer body as the medium, and the inspection image information is acquired from the intermediate transfer body, the image processing method further comprising:
   transferring the image printed on the intermediate transfer body to a recording medium, if it is determined that no fault exists in the image printed on the intermediate transfer body, and
   abandoning the image printed on the intermediate transfer body and printing the synthetic image information on the intermediate transfer body again, if it is determined that a fault exists in the image printed on the intermediate transfer body.

10. An image processing apparatus, comprising:
    a synthesizing unit configured to create synthetic image information having a specific frequency in which information is synthesized with main image information;
    a printing device configured to print the synthetic image information created by the synthesizing unit onto a medium;
    an inspection image input unit configured to acquire an image printed on the medium by the printer as an inspection image information;
    an information extracting unit configured to extract a distribution of the specific frequency component from the inspection image acquired by the inspection image input unit; and
    a fault determining unit configured to determine a fault in the image printed on the medium based on the distribution of the specific frequency component extracted from the inspection image by the information extracting unit.

11. The image processing apparatus according to claim 10, wherein the information extracting unit extracts the distribution of the specific frequency for each small area having a size larger than the cycle of the frequency in the inspection image, and
    the fault determining unit determines a fault in the unit of a small area in the inspection image.

12. The image processing apparatus according to claim 10, wherein the synthesizing unit creates the synthetic image information by embedding auxiliary information into the main image information in an invisible state using key information,
    the information extracting unit extracts the specific frequency component of the key information from the inspection image, and
    the fault determining unit determines the fault in the image printed on the medium based on the distribution of the specific frequency component of the key information extracted from the inspection image by the information extracting unit.

13. The image processing apparatus according to claim 12, wherein the synthesizing unit embeds the information as an achromatic color in the main image information by performing color difference modulation on the key image information created by using a group of two complementary colors on the key image information.

14. The image processing apparatus according to claim 12, wherein the synthesizing unit creates synthetic image information by embedding auxiliary information in the invisible state into the main image information by using a digital watermarking carrier signal based on the key information;

the information extracting unit extracts the digital watermarking carrier signal from the inspection image; and the fault determining unit determines a fault in the image printed on the medium based on the distribution of the digital watermarking carrier signal extracted from the inspection image by the information extracting unit.

15. The image processing apparatus according to claim 14, wherein the information extracting unit extracts the digital watermarking carrier signal for each small area having a size larger than the cycle of the digital watermarking carrier signal in the inspection image; and the fault determining unit determines a fault in the unit of the small area in the inspection image.

16. The image processing apparatus according to claim 15, wherein the fault determining unit comprises a candidate extracting unit to extract an area of a fault candidate from each small area in the inspection image; and a determining unit to determine whether or not the extracted area of the fault candidate is an image fault, based on a predetermined condition.

17. The image processing apparatus according to claim 16, wherein the determining unit compares image information in the inspection image corresponding to the extracted area of the fault candidate with image information in the synthetic image information corresponding to the extracted area of the fault candidate to determine whether or not any image fault exists.

18. The image processing apparatus according to any one of claims 10, or 11 to 17, wherein the printer prints the synthetic image information created by the synthesizing unit on an intermediate transfer body as the medium, and the inspection image input unit acquires an image formed on the intermediate transfer body by the printer as inspection image information, the image processing apparatus further comprising:

a transfer unit configured to transfer the image printed on the intermediate transfer body to a recording medium, if it is determined that no fault exists in the image printed on the intermediate transfer body by the fault determining unit; and a print control unit configured to abandon the image printed on the intermediate transfer body and print the synthetic image information on the intermediate transfer body again, if it is determined that a fault exists in the image printed on the intermediate transfer body by the fault determining unit.

* * * * *